Sept. 23, 1947.  M. A. GRUNLAN  2,427,855
ECCENTRIC BORING TOOL WITH MEANS FOR BORING TAPERS
Filed Sept. 10, 1945  2 Sheets-Sheet 1
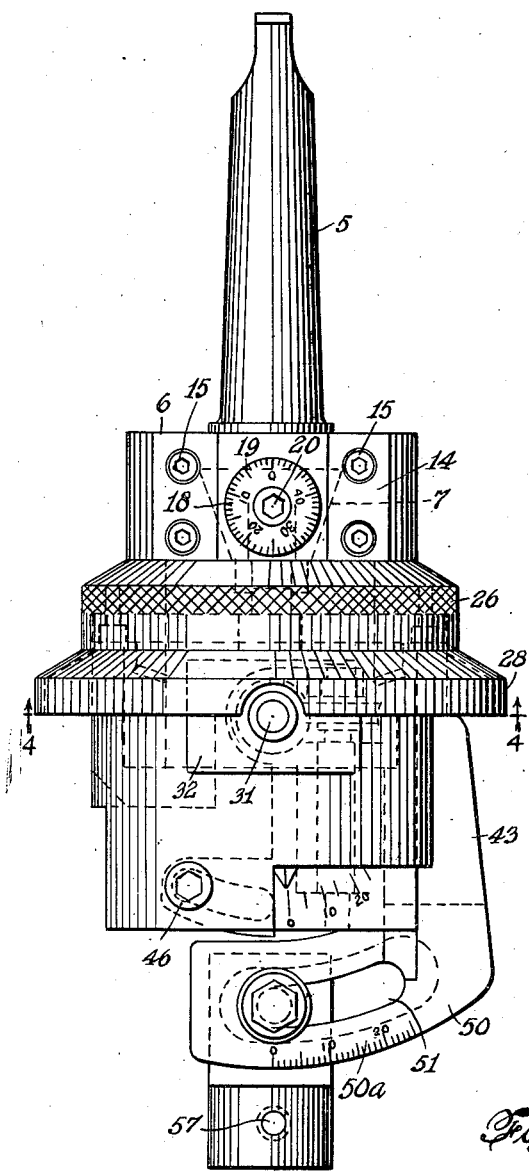
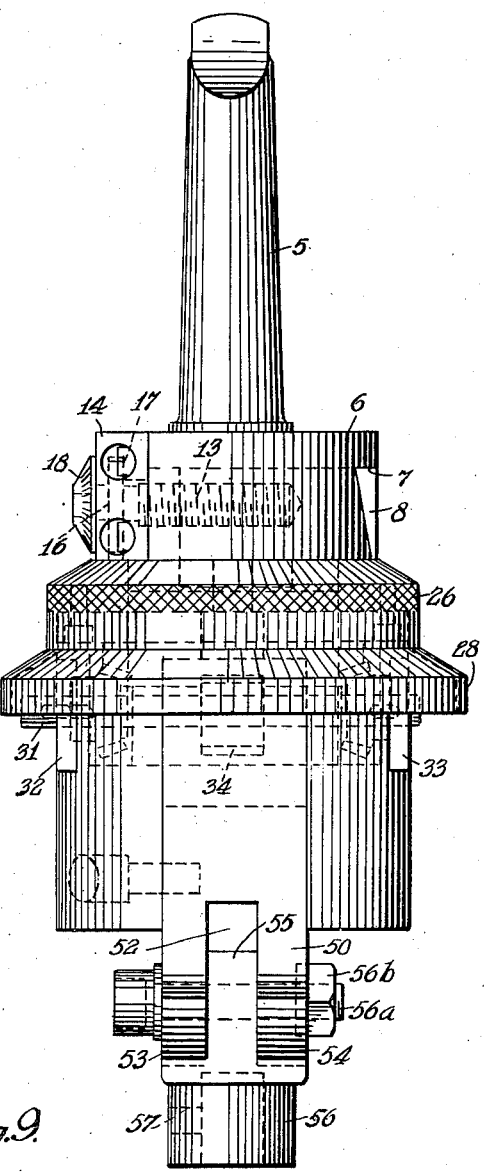
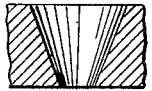
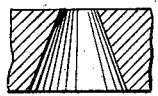
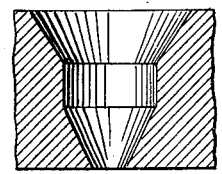
INVENTOR.
MAGNUS A. GRUNLAN
BY
ATTORNEY.

Sept. 23, 1947.  M. A. GRUNLAN  2,427,855
ECCENTRIC BORING TOOL WITH MEANS FOR BORING TAPERS
Filed Sept. 10, 1945  2 Sheets-Sheet 2
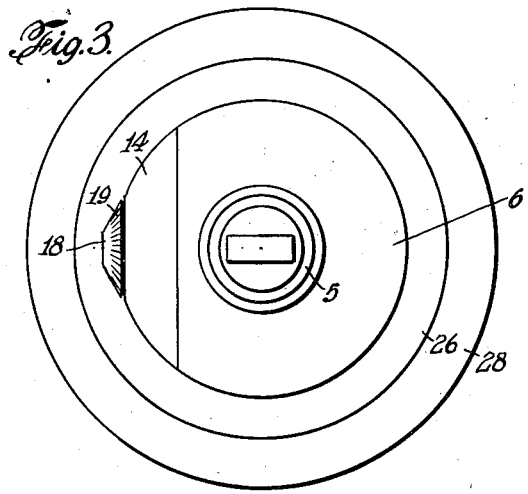
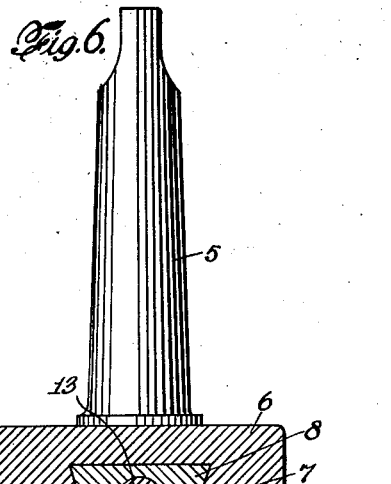
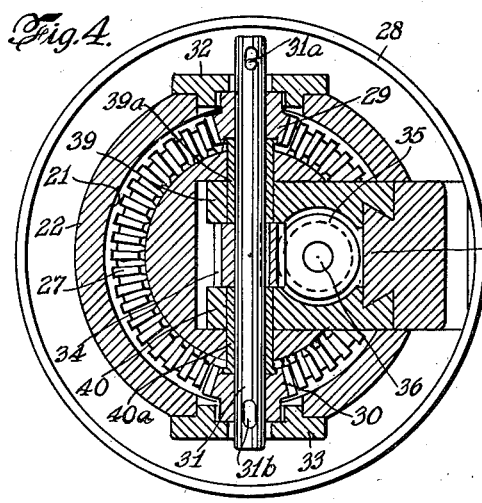
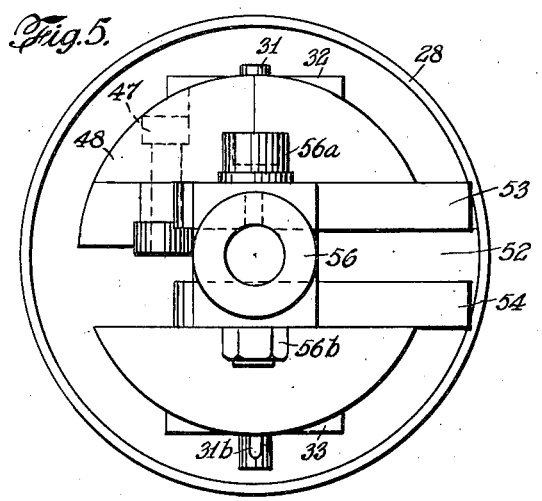
INVENTOR.
MAGNUS A. GRUNLAN
BY
ATTORNEY.

Patented Sept. 23, 1947

2,427,855

UNITED STATES PATENT OFFICE 2,427,855

ECCENTRIC BORING TOOL WITH MEANS FOR BORING TAPERS

Magnus A. Grunlan, Brooklyn, N. Y.

Application September 10, 1945, Serial No. 615,411

6 Claims. (Cl. 77—58)

1

This invention relates to an improved tool for use in lathes, milling machines, boring mills and drill presses, for boring eccentric holes, jig borers, and for boring holes having a downwardly increasing taper, or an upwardly increasing taper width, and one of its objects is to provide a tool of this character with means for offsetting the chuck carrying the cutting tool, and independent means for controlling the angle of adjustment of the tool holder, with reference to the supporting shank of the combined unit.

Another object of the invention is the provision of an eccentric boring tool, with a tool carrier which is mounted to swing on the body of the tool, and means capable of being operated while the tool is rotating, so that the depth of cutting may be progressively increased at any angle within the capacity of the tool.

A further object of the invention is to provide a main body which is slidable on the shank which supports the tool in the jig borer, milling machines or other machine tool, a tool carrier mounted to swing in the main body, means for locking the tool carrier in any of its adjusted positions, and a tool holder or chuck which has an independent adjustment on the tool carrier.

With the above and other objects in view, the invention comprises certain new and useful constructions, combinations and arrangements of parts, clearly described in the following specification and fully illustrated in the drawings, in which—

Fig. 1 is a side elevation, showing the micrometer adjustment for controlling the eccentric adjustment of the main body.

Fig. 2 is another side elevation, taken at right angles to that of Fig. 1, showing the slotted tool carrier.

Fig. 3 is a top plan view.

Fig. 4 is a cross sectional view, taken on line 4—4.

Fig. 5 is a bottom plan view.

Fig. 6 is a longitudinal sectional view, showing the shank in elevation.

Fig. 7 is a cross sectional view through work which has been bored to provide a downwardly narrowing tapered hole.

Fig. 8 is a similar view, showing a reverse tapered hole.

Fig. 9 is a similar view, showing a hole having different end tapers and an intermediate cylindrical section, illustrating the range of boring made possible by the improved tool.

Referring to the accompanying drawings, which illustrate the practical embodiment of the invention 5 designates a tapered shank, which is formed integral with the head block 6. This block is milled to provide a relatively large dovetailed slot or groove 7, which snugly receives the slide 8, which is of corresponding shape.

2

This slide is formed with a pendant tenon 9, which fits in a groove 10, formed in the main body 11, and is held in place by means of the heavy machine screw 12, the shank of which extends through the main body 11.

A worm shaft or adjusting screw 13 is threaded through the slide 8, and engages on its outer end portion the retaining bearing block 14, which is attached to the head block 6, by means of screws 15. The screw shaft 13 is provided with a collar 16 which engages the parallel guide slots 17, formed in the bearing block 14, and the outer end of the screw shaft 13 is equipped with a micrometer index head or cone 18, which is suitably indexed at 19. The central portion of this head or cone 18 is provided with a key socket 20, so that a suitable key may be inserted therein and the shaft 13 turned. When the shaft 13 is turned the slide 8 will be shifted at right angles to the axis of the shank 5.

The main body block 11 is circular and is formed with a circular recess 21, which provides an annular outer wall 22, having a reduced upper edge portion 23, which is lower than the central portion of the block, which is mounted directly against the plane bottom face of the head block 6, so as to have full bearing engagement therewith.

Over the reduced edge portion 23 an annular member or ring 24 is mounted by means of a plurality of screws 25 against the underside of the operating collar 26. The ring 24 fits snugly around the circular central portion of the main body block 11, and is provided with a circular gear ring 27, which projects into the annular recess 21. The collar 26 is formed with an integral skirt 28, which is spaced concentrically of the outer circular wall 22, and suitably knurled.

The teeth of the gear ring 27 engage the teeth of the bevel gears 29 and 30, which are mounted on the ends of the horizontal shaft 31. The hub of the gear 29 engages the adapter or bearing plate 32, held in place on the wall 22 by suitable screws, and the hub of the gear 30 engages the bearing plate 33, held in place on the opposite side of the wall 22, by means of suitable screws.

Intermediate of its ends the cross shaft 31 carries a worm 34, which is keyed thereto, and this worm engages worm gear 35, mounted on the feed screw 36, which has a bearing at 37 on the upper member of the tool carrier 38. This upper member of the tool carrier is provided with integral hings bearing arms 39 and 40, which engage the sleeves 39a and 40a mounted on the cross shaft 31. The feed screw 36 also has a bearing at 41 on the upper member 38 of the tool carrier. The feed screw 36 engages the nut 42 of the movable member 43 of the tool carrier, which comprises the members 38 and 43. This movable member is formed with an integral dovetailed slide 44, which works in a dovetailed groove formed in the upper member 38.

The cross shaft 31 is provided with a key 31a to engage the gear 29, and with a key 31b to engage the gear 30. This shaft is mounted to slide so that one of these gears may be engaged with the shaft and the other gear disengaged from the shaft. The intermediate worm will remain always engaged to the shaft. By shifting the shaft 31 the direction of feed of the screw 36 may be changed at will. By turning the collar 26 the rack or gear ring 27 will cause the cross shaft 31 to turn, thereby imparting motion to the worm 34, which will turn the feed screw 36, through the worm gear 35, and shift the lower tool carrier member 43 on the upper tool carrier member 38.

The upper tool carrier member 38 is constructed with an integral arm 45, which is formed with a curved slot 45a, through which the clamping bolt 46 extends. This bolt engages the nut 47, as shown in bottom plan, in view of Fig. 6. The bolt 46 extends through the side wall 48. The lower carrier member 43 is provided with a curved arm 50, which is formed with a curved slot 51, and this arm 50 is bifurcated by the slot 52, to provide side walls 53 and 54, between which the central stud or flange 55 of the tool holder or chuck 56 is clamped by means of the cross bolt 56a, and the nut 56b. The chuck 56 is provided with a set screw 57 for clamping a suitable cutting tool therein.

While the shank and the whole tool is rotating the collar 26 may be manually turned so as to operate the feed screw 36. The direction of turning of the feed screw is controlled by the two bevel gears 29 and 30. By shifting one of these bevel gears into engagement with the gear ring, and the other gear out of engagement with the gear ring, by sliding the cross shaft 31, the necessary change may be effected in the operation of the feed screw 36.

The improved boring tool provides for controlled adjustment of the eccentricity of the tool holder, it provides means for varying the angle of the tool carrier, and independent means for supporting the tool holder in different angles on the tool carrier.

The feed of the tool holder is accomplished in all positions of the tool holder on the tool carrier, and the feed is not subject to displacement because of the cutting pressure developed by the cutting tool against the work.

With my improved tool a cylindrical hole may be bored in the work, or a downwardly narrowing tapered hole, as shown in Fig. 7, or a downwardly widening tapered hole, as shown in Fig. 8, or a combination of a cylindrical hole and differently tapered end portions, as shown in Fig. 9, may be formed.

Having described the invention, I claim as new:

1. A boring tool, comprising a shank, a block slidably mounted on the shank, a micrometer screw for shifting the block on the shank, a carrier member pivotally mounted on the block, a second carrier member slidably mounted on the first carrier member, means for clamping the first carrier member in various positions of pivotal adjustment, a tool holder adjustable on the second carrier member, a ring gear carried by the block, a feed screw for shifting the second carrier member on the first carrier member, a shaft having pinion bevel gears engaging the ring gear, a worm on said shaft, and a worm gear on the feed screw engaged by said worm.

2. The construction set forth in claim 1, including a collar connected to the ring gear for turning the ring gear to cause the feed screw to turn.

3. The construction set forth in claim 1, including shiftable bevel gears on the shaft, whereby the direction of turning of the feed screw may be changed at will.

4. A boring tool, comprising a shank, a block connected thereto, a shaft mounted transversely of the block, a collar mounted to turn on the block and provided with a bevel ring gear, pinion bevel gears slidable on the shaft to engage and be disengaged from the bevel ring gear, a tool carrier member pivotally mounted on the shaft, an arm carried by said member and provided with a curved slot, a bolt extending through said slot into the block for clamping the carrier member against movement, a second carrier member slidable on the first carrier member, a feed screw carried by the first carrier member for shifting the second carrier member thereon, said second carrier member having a curved arm provided with a slot, a tool holder mounted on said last-named curved arm and provided with a bolt for adjustably securing the tool holder in various positions on said last-named curved arm, a worm gear on the feed screw, and a worm carried by the shaft and engaged with the worm gear.

5. In a taper boring tool, the combination with a head block and means for attaching said head block to a revolving member of a machine tool, of a substantially cylindrical main body slidable transversely of said head block tool carrying means pivotally mounted within said main body, tool feeding means mounted on said tool carrying means and actuating means for said tool feeding means, said actuating means comprising a collar externally and concentrically mounted on said main body and operable by rotation relative to said main body.

6. In a taper boring tool, the combination with a head block and means for attaching said head block to a revolving member of a machine tool, of a substantially cylindrical main body slidable transversely of said head block tool carrying means pivotally mounted within said main body, tool feeding means mounted on said tool carrying means and actuating means for said tool feeding means, said actuating means comprising a collar externally and concentrically mounted on said main body and operable by rotation relative to said main body, said actuating means further comprising gearing connecting said collar and said tool feeding means, said gearing being reversible by means extending exteriorly of said main body.

MAGNUS A. GRUNLAN.

REFERENCES CITED

The following references are of record in the file of this patent:

UNITED STATES PATENTS

| Number | Name | Date |
|---|---|---|
| 816,854 | Fernandez | Apr. 3, 1906 |